United States Patent [19]

Brandsaeter et al.

[11] Patent Number: 4,506,352
[45] Date of Patent: Mar. 19, 1985

[54] METHOD FOR USE IN MARINE SEISMIC DATA GATHERING

[75] Inventors: Helge Brandsaeter, Oslo; Olav Eimstad, Asker, both of Norway

[73] Assignee: Geophysical Company of Norway A/S, Hovik, Norway

[21] Appl. No.: 317,880

[22] Filed: Nov. 3, 1981

[30] Foreign Application Priority Data

Nov. 12, 1980 [NO] Norway .................. 803400

[51] Int. Cl.³ .................................. G01V 1/38
[52] U.S. Cl. ......................... 367/21; 367/16; 367/20; 367/23; 367/49
[58] Field of Search ..................... 367/19–24, 367/56, 88, 96, 103, 104, 138, 16, 49; 181/110, 111

[56] References Cited

U.S. PATENT DOCUMENTS

| | | | |
|---|---|---|---|
| 3,331,050 | 7/1967 | Kilmer et al. | 367/23 |
| 3,414,874 | 12/1968 | Mcload | 367/20 |
| 3,479,638 | 11/1969 | Rusnak | 367/23 |
| 3,491,848 | 1/1970 | Giles | 367/20 |
| 3,506,955 | 4/1970 | Backus et al. | 367/23 |
| 3,581,273 | 5/1971 | Hedberg | 367/19 |
| 3,921,124 | 11/1975 | Payton | 367/17 |
| 4,134,098 | 1/1979 | Ruehle | 367/24 |
| 4,146,870 | 3/1979 | Ruehle | 367/20 |
| 4,326,271 | 4/1982 | Ziolkowski | 367/56 |

FOREIGN PATENT DOCUMENTS 0018053 10/1980 European Pat. Off. .
1417948 12/1975 United Kingdom .

*Primary Examiner*—Nelson Moskowitz
*Assistant Examiner*—K. R. Kaiser
*Attorney, Agent, or Firm*—Holman & Stern

[57] ABSTRACT

A method and apparatus for use in marine seismic data gathering comprises a vessel (1) is equipped for deploying and retrieving trailer cables and tows a plurality of cables (3) which are provided with at least one array of transmitters (5), which array constitutes a point source for a transmitter, and an acoustic cable, over the region to be investigated. The transmitter cables (3) are caused to become distributed laterally in relation to the tow direction, the distance between them, the firing power and firing timing being controlled from the vessel in accordance with data collected previously regarding the nature of the sea bed. The point source-formed transmitter arrays can be distributed both laterally and longitudinally in relation to the tow direction. The transmitter cables (3) are distributed laterally with the aid of otterboards (8).

7 Claims, 3 Drawing Figures

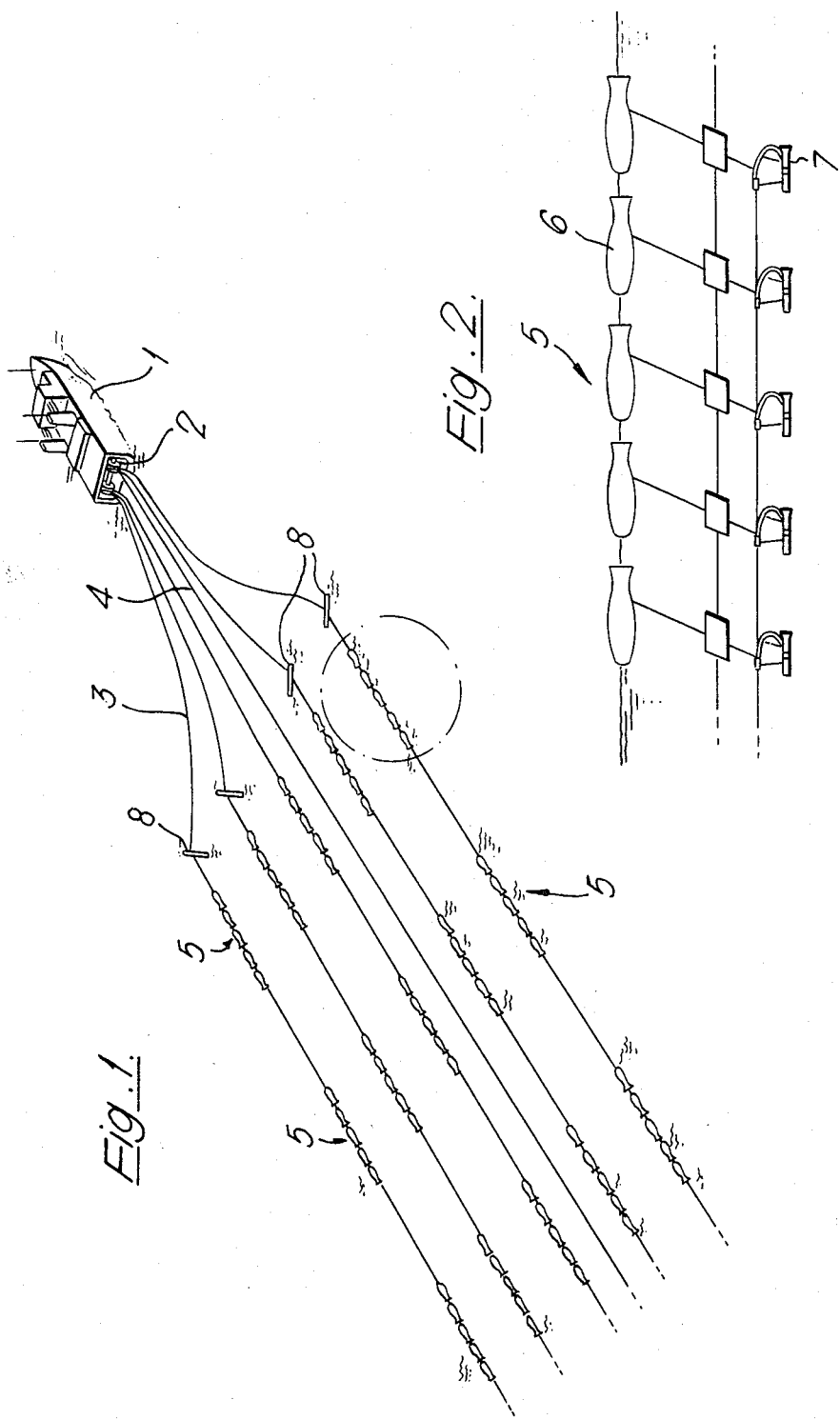

METHOD FOR USE IN MARINE SEISMIC DATA GATHERING

BACKGROUND OF THE INVENTION

1. Field of the Invention

The invention relates to a method of marine seismic data gathering, wherein a plurality of seismic signal transmitters and a receiver cable are towed behind an oceangoing vessel.

2. Description of the Prior Art

In geophysical investigations of the sea bed, it is necessary to procure data characteristic of the individual earth formations. This is done by sending out and recording seismic signals, which are emitted from an energy source as pressure pulses. The pressure pulses propagate downwardly to the geological stratifications, and some are reflected back and recorded. For each firing, the acoustic cable registers a reflection pattern. By continuously measuring this reflection pattern, one obtains a picture of the geological formation with strata, faults, etc. The energy source normally used in seismic explorations is the so-called air gun; such guns are towed behind a vessel and the reflected pulses are registered by means of an acoustic cable. The air guns work by releasing a certain volume of air which oscillates as a slowly decaying wave, the period of oscillation being dependent on the volume of air released.

In pulse reflection, however, it is advantageous if the wave can be given as "peaked" a shape as possible, i.e., so as to minimize pulse reverberations and thus obtain as pure a transmitter signal as possible. For this purpose, a plurality of mutually tuned air guns generating pulses simultaneously have been employed, being so tuned that pulse reverberations are compensated/counteracted while the first half-period of oscillation is reinforced. The guns are placed within a restricted area (in an array), and they may be considered as one transmitter which via the cooperation of the guns provides a sharp or high-peak pulse. Such transmitter sources may be termed "point sources".

These known point sources will give satisfactory signals, but since they are "nondirectional" transmitters it is difficult to determine the point of origin of the reflection, i.e., the exact position of the place being examined. In addition, there is the problem of background noise, i.e., disturbing reflections from the surface of the sea bed, reflections from a location lying in another direction in cases where a plurality of transmitters are being used, etc.

A directional transmitter would be desirable, i.e., a transmitter which provides a dominance in a predetermined direction of reflection. A known solution to this problem is to place several of the above-mentioned "point sources" in a row or array, whereby the array provides directivity in the vertical direction for the signals/reflections. Such a system is described in Norwegian Pat. No. 138,922 and corresponding British Pat. No. 1417948, dated Dec. 17, 1975, and is termed "Superlong Airgun Array".

When this system is used in practice, two to four arrays of point sources are towed behind a ship, with an acoustic cable provided with hydrophones positioned centrally between the rows. The signals which are transmitted will have directivity in the vertical direction and provide a good picture of the region being investigated.

This system, however, also has weaknesses, arising among other things because the sea bed of course is not level. Despite the fact that the concentration of the waves by means of the point sources provides as pure peaks as possible, and despite the directivity in the vertical direction one obtains, it is not possible, when the region being investigated is irregular, to avoid dispersion of the reflection and associated background noise when irregularities, a fall-off of the sea bed, etc., are encountered, and as a result there is a factor of uncertainty in connection with the information obtained.

BRIEF SUMMARY OF THE INVENTION

It is thus the object of the present invention, using the above prior art as a point of departure, to provide a new and improved system whereby the drawbacks discussed above may be avoided. The object of the invention is to provide a method which gives a more accurate determination of the position of the signal reflections and which enables a reinforcing or focusing of the transmitter signals at locations where the formations are difficult to measure, i.e., to provide the capability of adapting the transmitter effect to the actual conditions being investigated.

These objects are obtained with a method whose characteristic features are recited in the appurtenant patent claims.

With the invention, a further direction coordinate is provided, since the point source-formed "subarrays" are not only distributed along a line, but also across the width of the area being investigated. It is possible to control the firing of the separate sources individually, thus obtaining substantially improved control over the data gathering as compared to previous systems. A reinforcement/weakening of signals which will coincide at the reflection location can be obtained, whereby one can counteract error sources which may arise in uneven terrain, for example, with steeply sloping formations. The distance between the transmitter sources can be varied in the directions of both length and width. Experience has shown that a significant signal efficiency is obtained.

Hereby the directional power and/or frequency of the energy source may be varied in dependence of the depth and/or shape of the formation and in accordance with the propagation rate of the sound waves through the formation structure by adjusting the distance between the said transmitters in the longitudinal and/or lateral direction.

It is possible with the aid of the invention to aim the energy source, i.e., the collective transmission of signals, toward a specific interesting structure. The ground formations which are to be mapped are studied with a kind of acoustic lens. With the aid of earlier information about the form of the strata, the depth and the rate of speed, one can form the energy source or adjust it so as to obtain maximum energy for a specific reflector, while at the same time minimizing the energy from multiple reflections. This focusing effect is obtained by forming the transmitter so that the transmitter points are distributed over a surface, and firing the various point sources at different times.

It is previously known to spread air guns over a relatively large area, and in different patterns. In all such cases, however, only single guns have been used, and the intention with such "area distributions" has either been to investigate a rather large region all at once or to provide a special reflection pattern. The present invention has a different approach, since the intention is not to provide a broader system, but rather to focus a primary signal and to avoid background noise, i.e., to improve the quality of the information obtained at a reflection site.

BRIEF DESCRIPTION OF THE DRAWINGS

The invention will be explained in greater detail in the following with the aid of two embodiment examples which are illustrated in the accompanying drawings, wherein FIG. 1 is a schematic drawing of one embodiment of the invention, FIG. 2 shows a detail of the apparatus of FIG. 1.

DETAILED DESCRIPTION

Figure 3:
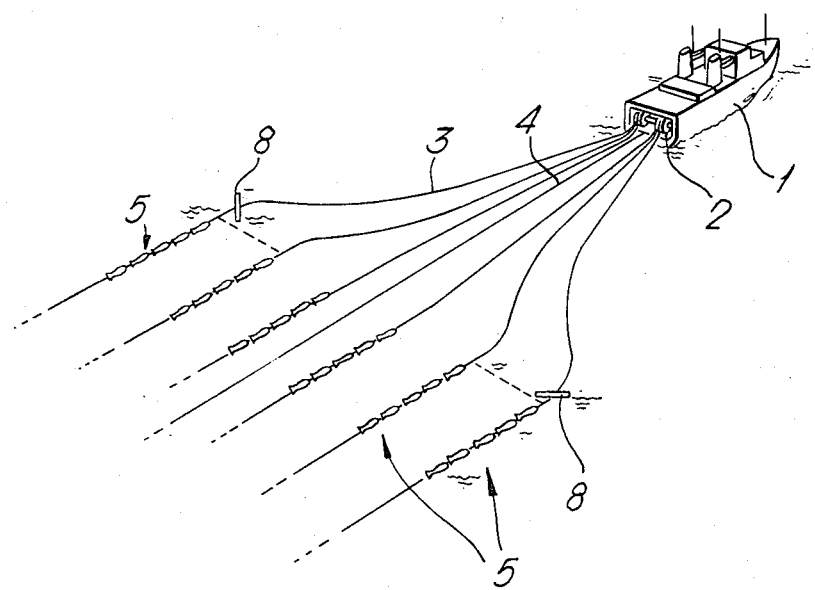
FIG. 3 illustrates a second embodiment of the invention.

FIG. 1 shows a vessel 1 which is especially built for towing cables for seismic investigations of the sea bed, and which also includes equipment for recording and storing the information so received. Mounted at the stern of the ship are drum winches 2 for deploying and hauling in trailer cables 3, as well as a means (not illustrated) for laying and retrieving an acoustic cable 4. The trailer cables 3 carry air guns which are arranged in groups or subarrays 5. Such a subarray is shown in greater detail in FIG. 2, and is in principle composed of a plurality of float bodies 6 each bearing an air gun 7. Arranged between the air gun 7 and the float body 6 is a collector means for the connecting lines for triggering the air guns. Within each subarray, the air guns 7 are tuned to each other so that they together form a point source transmitter, as explained above. The distance between the individual subarrays can be varied, and the construction of the trailing cable system is as described in Norwegian Pat. No. 138,922 and corresponding British Pat. No. 1417948, supra.

In accordance with the invention, the trailer cables are to be distributed in a predetermined manner in the lateral direction relative to the direction of advance of the vessel. For this purpose, an otterboard 8, also provided with float bodies, is attached to the cables, and the position of the otterboards can be controlled from the ship. With the boards 8 appropriately positioned, the cables will become spread out laterally so that they are distributed over a specific surface area.

It is easily possible to tow six such parallel arrays behind a vessel. The distance between the subarrays 5 along the length of the trailer cable can be varied, as can their distance apart in the lateral direction by adjustment of the otterboards 8, such that the width of the transmitter area can be varied, e.g., from 5 to 75 meters.

FIG. 3 shows a second embodiment of the invention. A vessel 1 corresponding to that shown in FIG. 1 is used for towing. Trailer cables 3 and an acoustic cable 4 positioned centrally as in the first embodiment are also utilized. This embodiment differs from the first, however, because instead of subarrays of point source transmitters distributed along the trailer cables, only one transmitter subarray at the end of each trailer cable is used. Lateral distribution of the trailer cables is obtained in the same manner as in the first embodiment example, with the aid of otterboards 8. With this embodiment, a surface area is simulated by adding up the data from successive firings of the point-source transmitter regions 5 which are distributed across the width.

The invention may be modified in many different ways within the scope of the claims. The requirements for the energy sources will vary according to what type of region is being investigated. The seismic signals which are to be recorded will have different frequency contents and apparent wave lengths. The noise picture will also vary from one region to another. It follows from this that one must be able to change the directivity of the energy source as a function of the geological conditions being investigated. This is done simply by varying the geometry of the transmitter source, i.e., the number of elements used, the extent of the area they are to cover, and the distance between the elements. By means of winches, the distances between the elements can be changed with simple hand movements. One is not restricted to a rectangular pattern. Star-shaped, fan-shaped, cross-shaped or circular sources can also be provided.

All of the earlier systems which have been described represent merely simple expansions of point sources. The approach is to distribute a point source consisting of two or three strings of air guns laterally to cover a greater width. Such a solution has obvious weaknesses, since one has little or no flexibility in varying the geometry, and in addition each element consists of one gun with the weaknesses this entails, i.e., a narrow-band pulse with long pulse train reverberations; moreover, it is very difficult to calculate the total response of the system.

We claim:

1. In a method for use in marine seismic surveys for obtaining measurement data from subterranean formations, in which a plurality of transmitters of seismic signals and an acoustic cable are towed behind a vessel, wherein the transmitters are deployed in the water in arrays for the formation of point-source-formed subarrays, the improvement comprising, controlling the emitted power and the firing timing of the seismic signals from the vessel in accordance with data collected previously regarding the nature of the sea bed and/or the subteranean formation, varying the directivity of the subarrays in accordance with the depth, thickness and/or configuration of the subterranean formation and in accordance with the propagation rate of the sound waves through the formation structure by regulating the spacing between the subarrays, so that the emitted energy is focused to a limited area.

2. A method according to claim 1, wherein said regulating the spacing between the point-source-formed subarrays comprises distributing said subarrays over a surface area in both the lateral and longitudinal directions.

3. A method according to claim 1, wherein said regulating the spacing between the subarrays comprises distributing the transmitters laterally by means of otterboards and paravanes.

4. The method as claimed in claim 1 and further comprising, varying the frequency of the seismic signals generated by the subarrays in accordance with the depth, thickness and/or configuration of the subterranean formation and in accordance with the propagation rate of the sound waves through the formation structures by firing the subarrays at different points in time.

5. A method according to claim 4, wherein said regulating the spacing between the point-source-formed subarrays comprises distributing said subarrays over a surface area in both the lateral and longitudinal directions.

6. A method according to claim 4, wherein said regulating the spacing between the subarrays comprises distributing the transmitters laterally by means of otterboards and paravanes.

7. In a method for use in marine seismic surveys for obtaining measurement data from subterranean formations, in which a plurality of transmitters of seismic signals and an acoustic cable are towed behind a vessel, wherein the transmitters are deployed in the water in arrays for the formation of point-source-formed subarrays, the improvement comprising controlling the emitted power and the firing timing of the seismic signals from the vessel in accordance with data collected previously regarding the nature of the sea bed and/or the subterranean formation, and varying the frequency of the seismic signals generated by the subarrays in accordance with the depth, thickness and/or configuration of the subterranean formation and in accordance with the propagation rate of the sound waves through the formation structure by firing the subarrays at different points in time, so that the emitted energy is focused to a limited area.

* * * * *